Figure 6:
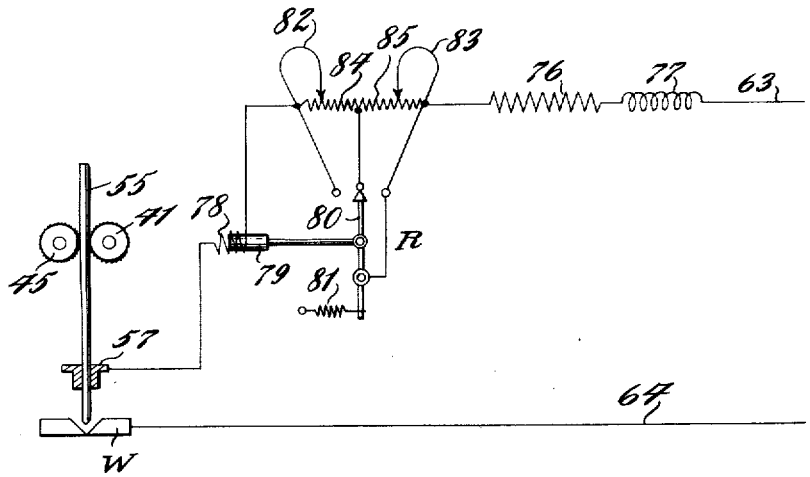

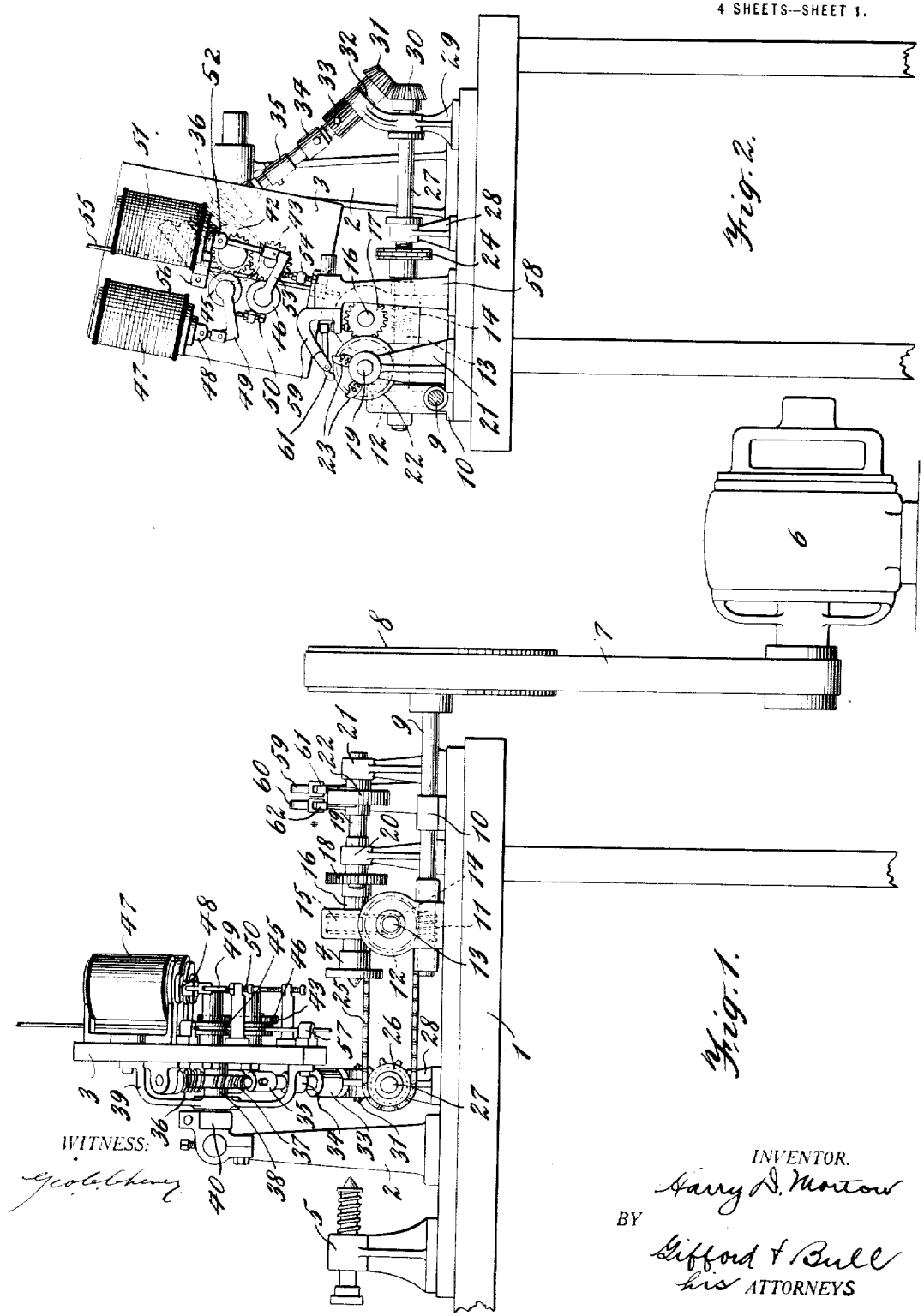

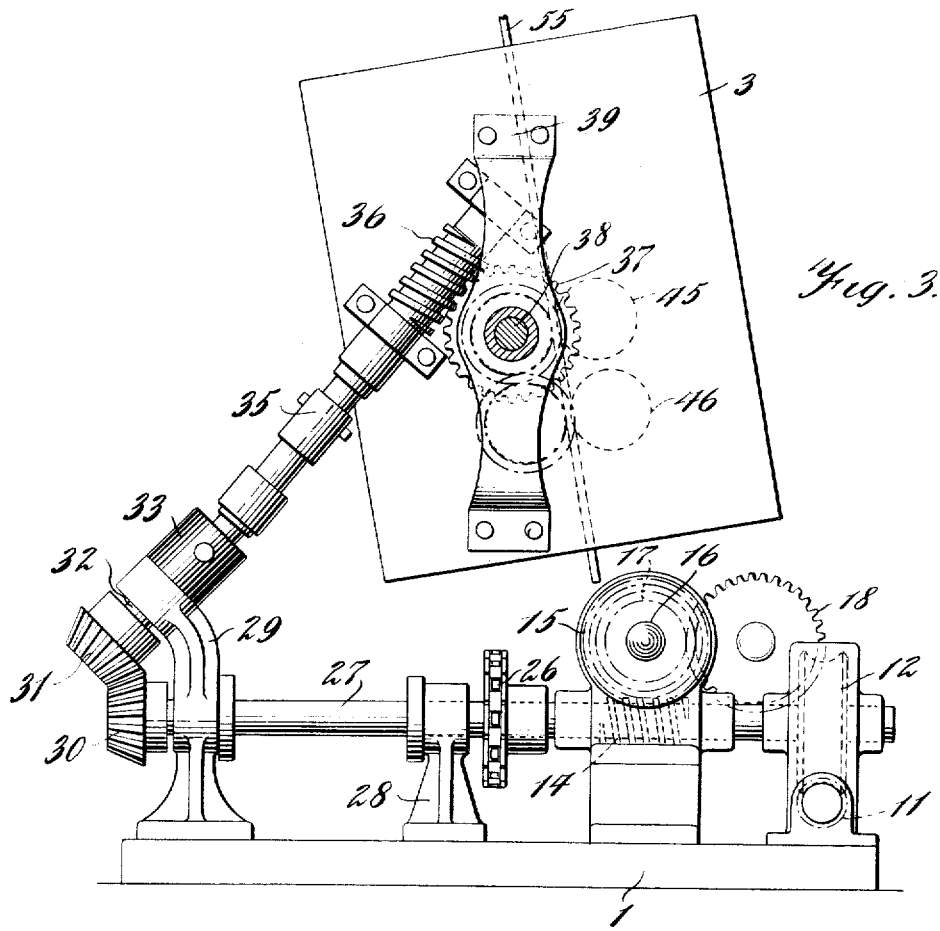
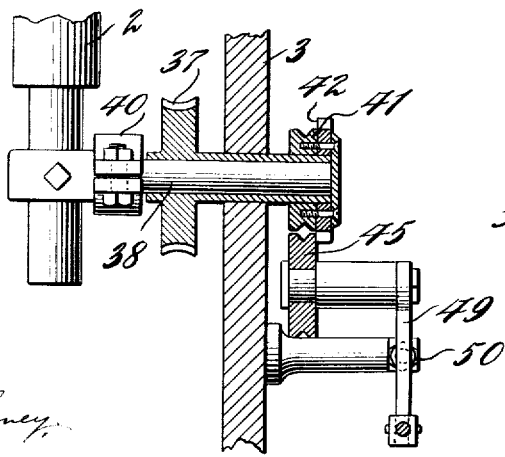

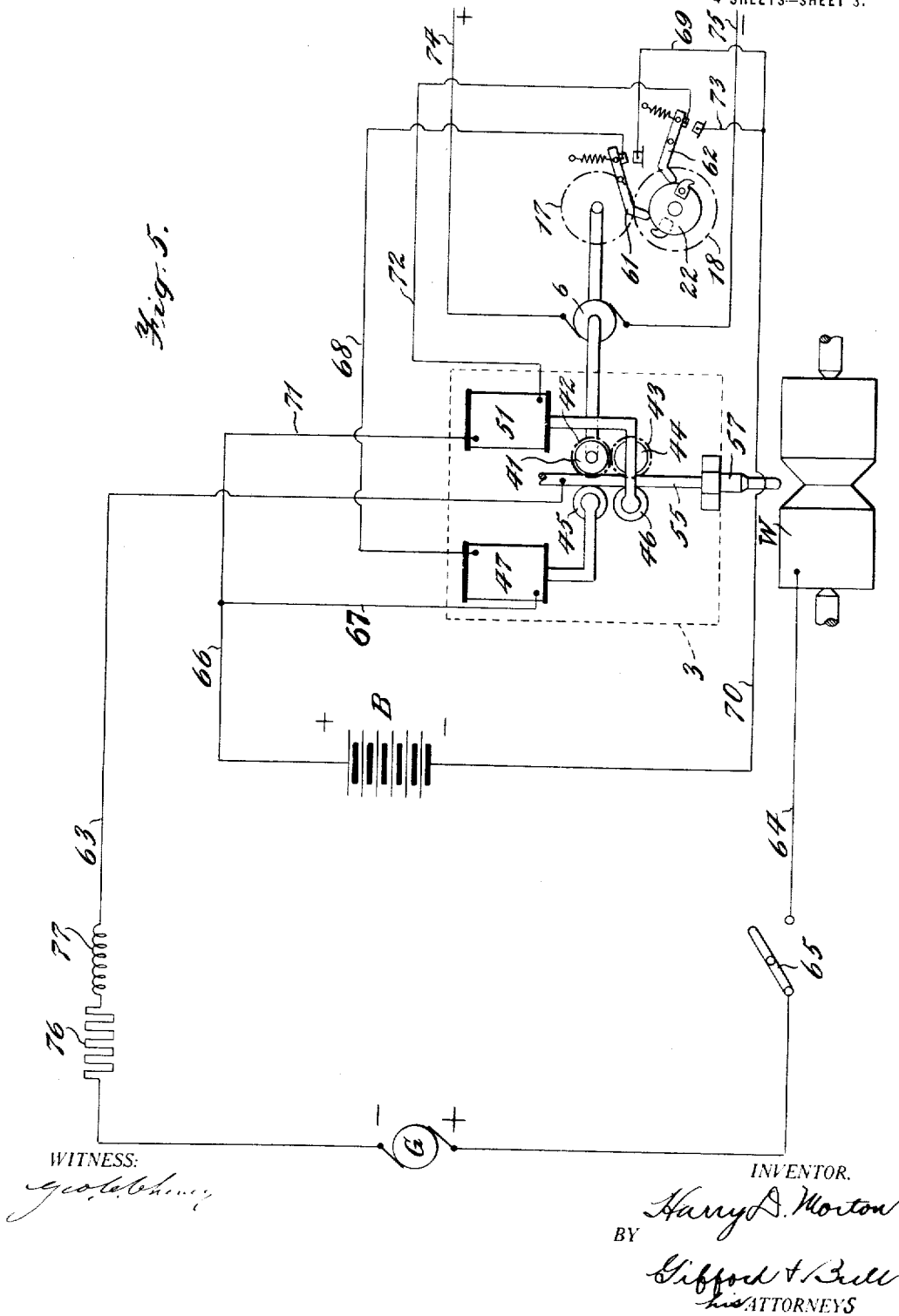

H. D. MORTON.
METHOD OF AND APPARATUS FOR ARC WELDING.
APPLICATION FILED DEC. 2, 1918.

1,392,436.

Patented Oct. 4, 1921.
4 SHEETS—SHEET 4.

Inventor
Harry D. Morton
By his Attorneys
Gifford & Bull

UNITED STATES PATENT OFFICE.

HARRY D. MORTON, OF DETROIT, MICHIGAN, ASSIGNOR TO AUTOMATIC ARC WELDING COMPANY, OF DETROIT, MICHIGAN, A CORPORATION OF MICHIGAN.

METHOD OF AND APPARATUS FOR ARC-WELDING.

1,392,436.      Specification of Letters Patent.      Patented Oct. 4, 1921.

Application filed December 2, 1918. Serial No. 264,929.

*To all whom it may concern:*

Be it known that I, HARRY D. MORTON, a citizen of the United States, residing at Detroit, in the county of Wayne and State of Michigan, have invented certain new and useful Improvements in Methods of and Apparatus for Arc-Welding, of which the following is a specification.

My invention relates to a new and useful improvement in method of and apparatus for arc welding and it has for its object the improvement of such method and apparatus.

In my renewal application Serial #186,238 I have shown and claimed broadly, means for accurately correlating the rate of fusion and the rate of feed of the welding strip to one another to maintain the arc in spite of any ordinary internal variations thereof, or minor inaccuracy of rate of feed. The particular mechanisms for doing this were such as varied the rate of feed of the strip to compensate for fluctuations in the arc or rate of fusion of the electrode tending either to extinguish the arc or to bring the electrodes into contact. In both cases the necessary stabilizing or ballistic resistance was employed as usual in operating an arc upon a constant potential circuit.

By the invention disclosed herein, I provide different means for controlling the relation between the rate of fusion and the rate of feed of the welding strip to accomplish stable operation.

In the drawings, Figure 1 shows a front elevation of the mechanism of an arc welding apparatus embodying my invention; Fig. 2 shows an end elevation; Fig. 3 is an enlarged sectional elevation of the welding head and a portion of the driving mechanism; Fig. 4 is a sectional view of a portion of the welding head; Fig. 5 is a wiring diagram showing the various circuits; and Figs. 6 and 7 are diagrammatic views showing modified forms of my invention.

Referring to the drawings and first to Figs. 1, 2 and 3, the mechanism is mounted upon any suitable base, such as a table 1, insulated from which is the welding head stanchion 2 carrying welding head 3. The work-supporting means comprises driving head 4 and tail-stock 5. The mechanism is driven by any suitable source of power, such as motor 6, through belt 7 and pulley 8, mounted on shaft 9, which is supported in bearing 10. This shaft 9 carries a worm 11 which meshes with and drives worm gear 12, mounted on shaft 13, which shaft also carries worm 14 and sprocket wheel 24. Worm 14 meshes with and drives worm gear 15, which is mounted on shaft 16, carrying driving head 4 and cam member driving gear 17. Gear 17 drives cam member driven gear 18, which is mounted on shaft 19, supported in bearings 20 and 21. Shaft 19 also carries cam member 22. Adjustably mounted on either side of this cam member are cams 23 which control switch members 61 and 62 in circuit respectively with direct feed solenoid 47 and reverse feed solenoid 51. The drive is transmitted from sprocket wheel 24 through sprocket chain 25, to sprocket wheel 26, mounted on shaft 27. This shaft 27 is mounted in bearings 28 and 29 and carries at its outer end bevel gear 30 meshing with and driving bevel gear 31 mounted on shaft 32. The insulating coupling 33 connects shaft 32 with universal joint 34, the upper end of which joint is attached to shaft 35. This shaft carries worm 36, which meshes with and drives worm gear 37 mounted on shaft 38 which has its bearings in yoke 39 and in welding head 3. This yoke 39 is rigidly attached to welding head 3 and is supported by the clamping member 40, which clamping member is connected to the arm of stanchion 2. At the outer end of shaft 38 is direct wire feed roll 41, attached to which is spur gear 42 meshing with and driving reverse feed roll gear 43, attached to reverse feed roll 44. Coacting with direct feed roll 41 is direct idler feed roll 45, which is eccentrically mounted on the bushing 49 and attached by link mechanism to the armature 48 of direct feed solenoid 47. The downward movement of the arm of eccentric bushing 49 is limited by adjustable stop 50. Coacting with reverse feed roll 44 is reverse idler feed roll 46, similarly mounted on eccentric bushing 53 attached by link mechanism to the armature 52 of reverse feed solenoid 51. Whenever switch member 61 is caused by its coacting cam to close the circuit of direct feed solenoid 47, idler feed roll 45 will be moved toward feed roll 41 and thereby feed the welding strip 55 downward through guides 56 and 57, and toward the work. Whenever the switch member 62 is caused by its coacting cam to close the circuit of reverse feed solenoid 51, idler feed roll 46 will be moved toward reverse feed roll 44 to feed the welding strip 55 upward through the guides 56 and 57, and away from the work. This reverse movement may be utilized for drawing the arc as well as for rupturing the arc when the weld is completed.

Referring to Fig. 5, G represents a generator for furnishing current to the welding circuit. The operation of the device here shown diagrammatically is as follows: With the switch 65 in the welding circuit closed, the motor 6 (which may derive its current from any source outside the welding circuit) is started. When the switch member 61 is actuated by its coacting cam a circuit will be completed as follows: From positive pole of battery B through line 66, line 67, direct feed solenoid 47, line 68, contacts of switch 61, line 69 and line 70 to the negative pole of battery B. This will result in the energizing of direct feed solenoid 47, the raising of the armature of which solenoid will bring direct idler feed roll 45 into contact with the welding strip 55. In this position the rotating direct feed roll 41, coacting with said direct idler feed roll 45, will cause the welding strip 55 to feed downward until it contacts with the work W. The cam which actuates switch member 61 is so proportioned that the switch is opened by its spring as soon as the welding strip contacts with the work. This results in the deënergizing of direct feed solenoid 47 and the consequent release from contact with welding strip 55 of direct idler feed roll 45. Thereupon switch member 62 is actuated by its coacting cam closing the following circuit: Positive pole of battery B, line 66, line 71, reverse feed solenoid 51, line 72, switch 62, line 73, line 70 to negative pole of battery B. This results in energizing reverse feed solenoid 51, and the raising of its armature brings reverse idler feed roll 44 into contact with the welding strip 55. As reverse feed roll 44 rotates in a clockwise direction, the welding strip 55 will be fed upward, thereby striking the arc. Immediately the arc is struck reverse feed solenoid 51 is deënergized by the opening of switch 62 through its coacting cam. Thereupon direct feed solenoid 47 is again energized by the closing of switch 61 through its coacting cam, the latter switch remaining closed during the welding operation. The timing of cam member 22 with relation to the movement of the work is such that upon the completion of the weld, direct feed solenoid 47 is deënergized and reverse feed solenoid 51 is again energized. This results in the welding strip 55 moving away from the work and causing the arc to rupture. When the arc has ruptured reverse feed solenoid 51 is again deënergized, leaving the welding strip 55 in position for the next succeeding weld.

Figure 7:
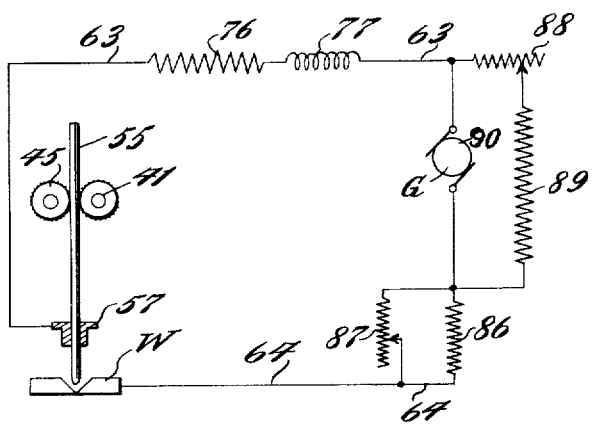

Referring to Fig. 6, in which I have shown a modified form of my invention, 63 and 64 are supply wires leading from a suitable constant potential source. The wire 64 connects to the work W, and the circuit is completed via electrode 55, holder 57, coil 78, resistances 84 and 85, stabilizing resistance 76 and reactance 77 to wire 63. 55 indicates the welding strip and 41 and 45 the feed rolls of a machine for continuously or with a rapid intermittent movement feeding the electrode toward the work. 57 is a guide or holder for the welding strip by which it receives most of its current. R is a regulating means, and 76 and 77 are stabilizing resistance and reactance respectively which are preferably employed. They need not be separate, as the resistance itself may be inductively wound. The regulating means comprises the magnet 78, rheostat 84, 85 and controlling arm 80, so arranged that an increase of the current operates to short-circuit the rheostat, a restoration of current to normal operates to insert one half of the resistance thereof, and the fall of the current below normal, operates to insert the entire resistance.

The mode of operation of the arrangement here shown is as follows: The normal speed of the electrode feeding mechanism, indicated diagrammatically at 41—45, is adjusted for a particular diameter and material of electrode, so as to produce a rate of feed of the welding strip substantially equal to the rate of fusion thereof with the normal current for which the circuit is adjusted. So long as the rate of fusion, and the rate of feed are equal, stable operation will continue, but upon any unbalancing, a tendency for an increase or a decrease of arc length will occur. If the rate of fusion should exceed the rate of feed, the arc will lengthen, and the current will decrease. The spring 81 is so adjusted that upon a definite decrease of current, rheostat arm 80 will be moved from its central or normal position to the right so as to include all of the rheostat 84—85 in the arc circuit. This increase of circuit resistance will still further decrease the current without, however, lowering it to the point of instability. The decreased current will result in a rate of fusion lower than the rate of feed, and the arc will rapidly be shortened. When the magnet 78 has been restored to normal strength, the rheostat arm 80 will be brought back to its normal position by the action of the magnet in overcoming the pull of the spring 81. Should the rate of feed exceed the rate of fusion, thereby giving rise to a shorter arc and too large a current, the magnet 78 will move the rheostat arm to the left, thereby short-circuiting the rheostat 84—85 and still further increasing the current. The increased rate of fusion thereby brought about will restore the arc to normal length, and the current to normal value, and the rheostat arm will be moved by the spring 81 back to its normal position.

Under the conditions just discussed, I have assumed that the rate of fusion is to be the same as the rate of feed of the welding strip. Under some conditions, however, it is impossible to maintain an arc of a constant length, and, in fact, I contemplate varying the arc length somewhat in accordance with various requirements of the work. Moreover, when variations in the contour of the work are encountered, it becomes necessary to vary the relation between the fusing rate and the feeding rate of the welding strip. For instance, if an elevation or protuberance in the work is encountered, it becomes necessary to increase the fusing rate relatively to the feeding rate. On the other hand, when a depression in the work is encountered, it is necessary to increase the feeding rate relatively to the fusing rate. It is to be understood, therefore, that broadly I seek to control the relation between the fusing rate and the feeding rate of the welding strip.

While I have, for the sake of simplicity, diagrammatically illustrated the rheostat 84—85 as operated directly by the magnet 78, I do not limit myself thereto, as any mode of effecting the desired result may be employed whether direct, as indicated, or indirectly by means of relays as in ordinary relay controlled rheostats. The rheostat 84—85 is conveniently divided into two sections as shown, and the amount of resistance therein is determined experimentally. For the purpose of convenient adjustment, short circuiting loops 82—83 may be provided for readily adjusting these resistances to the desired value.

It should be observed that the immediate effect of the regulator R is to accentuate the effect already existing, and in the particular arrangement shown this is done by inserting or withdrawing from the circuit a definite amount of resistance. It will, of course, be understood that the minimum amount of resistance included in the circuit should never be less than that needed to correct the negative characteristic of the arc. It is not necessary that the regulating resistance should all be included or excluded at one step, as this may be done gradually so long as the limiting values, ascertained by trial, are not exceeded.

In Fig. 7, feeding mechanism is indicated diagrammatically in the same manner as in Fig. 6, like parts being similarly identified by reference characters. In this instance, the current is supplied to the welding machine through resistance 76 and reactance 77 by an over-compounded generator G, having an armature, a shunt field magnet 89, and series field magnet 86. The wire 63 leads from one terminal of the machine to the reactance 77, and the wire 64 leads from the other terminal to the work W. Shunted around the series coil 86 of the generator, is a variable resistance 87 for varying the effect of the series coil 86, and the shunt coil 89 has in series therewith a rheostat 88 for varying its effect. While I have shown the machine connected as a "short shunt" machine, this is not essential, as a long shunt connection may be employed. In the latter case, of course, the shunt field winding 89 would be connected to include the series coil 86, as well as the armature 90. The compounding is so proportioned that with the normal current flow, a normal circuit voltage will be furnished, but any increase or decrease of current will considerably affect the voltage.

The mode of operation of this arrangement is as follows: The feeding apparatus, typified by feed wheels 41—45, is adjusted under normal conditions, in such manner as to have the rate of feed substantially equal to the rate of fusion of the welding strip with the current for which the circuit is normally adjusted. If, due to a variation within the arc, the fusing rate should become less than the feeding rate, the arc will shorten, and the current will automatically increase. This increase of current will increase the strength of the series winding 86 of the generator, and increase the voltage, and hence the current supplied to the machine. This increase of current will increase the fusing rate, and thus rapidly lengthen the arc. Should the arc lengthen, due to a rate of fusion more rapid than the rate of feed, the current will decrease, thereby weakening the series field magnet 86, and reducing the current. This reduced rate of fusion will permit the feeding means to shorten the arc, thus again restoring normal conditions. By adjusting the rheostats 88 and 87, any desired degree of compounding can be obtained at the desired operating voltage and normal current, and within limits, this normal current can be varied as may best suit different sizes and material of welding strips. By proper adjustment, the variations in current, due to changes in the relation between fusing and feeding rates react upon the generator to restore the desired relation by accentuating the natural corrective tendencies of the arc as explained in connection with Fig. 6.

What I claim as new and desire to secure by Letters Patent is:—

1. In a metallic electrode arc welding apparatus, means for continuously feeding a welding strip toward the work, and means for varying the rate of fusion to control the relation between the rate of fusion and the rate of feed.

2. In a metallic electrode arc welding apparatus, means for continuously feeding a welding strip toward the work at a constant speed, and means for controlling the relation between the rate of fusion and the rate of feed.

3. In a metallic electrode arc welding apparatus, means for continuously feeding a welding strip toward the work, and means for varying the fusing current to control the relation between the rate of fusion and the rate of feed.

4. In a metallic electrode arc welding apparatus, means for continuously feeding a welding strip toward the work, and means responsive to changes in a characteristic of the arc for varying the fusing current to control the relation between the rate of fusion and the rate of feed.

5. In a metallic electrode arc welding apparatus, means for continuously feeding a welding strip toward the work, and means for controlling the relation between the rate of fusion and the rate of feed, said means responding to variations in energy supplied to the arc to vary the resistance of the arc circuit.

6. In a metallic electrode arc welding apparatus, means for continuously feeding a welding strip toward the work, and means comprising an over-compounded generator for supplying energy to the arc and controlling the relation between the rate of fusion and the rate of feed.

7. In a metallic electrode arc welding apparatus, means for continuously feeding a welding strip toward the work, and an over-compounded generator for controlling the relation between the rate of fusion and the rate of feed.

8. In a metallic electrode arc welding apparatus, means for continuously feeding a welding strip toward the work at a constant speed, and an over-compounded generator for accentuating the natural corrective tendencies of the arc.

9. The process of electric arc welding which consists in striking an arc between a welding strip and the work, continuously feeding said welding strip toward the work, and varying the rate of energy supply to control the relation between the rate of fusion and the rate of feed.

10. The process of electric arc welding which consists in striking an arc between a welding strip and the work, continuously feeding said welding strip toward the work, and controlling the relation between the feeding rate and the fusing rate by varying the resistance of the circuit to accentuate the changes in current resulting from changes in said relation.

11. The process of electric arc welding which consists in striking an arc between a welding strip and the work, continuously feeding said welding strip toward the work, and maintaining the arc by causing current changes resulting from changes in relation between the rate of fusion and the rate of feed to correctively vary the fusing rate.

12. The process of electric arc welding which consists in striking an arc between a welding strip and the work, continuously feeding said welding strip toward the work, and varying the circuit resistance by definite amounts to control the relation between the fusing rate and the feeding rate.

13. The process of electric arc welding, which consists in striking an arc between a welding strip and the work, continuously feeding the said welding strip toward the work at a constant speed and varying the rate of energy supply to control the relation between the rate of fusion and the rate of feed.

14. The improvement in that process of electric arc welding in which a metallic welding strip is continuously fed to the arc at a constant speed, which consists in maintaining the arc by causing arc variations to accentuate the normal compensatory action of the arc.

15. The improvement in the method of arc welding wherein a metallic welding strip is continuously fed toward the work, which consists in utilizing a characteristic of the electric generator which supplies electric energy to the arc to accentuate the natural corrective tendencies of the arc.

16. The improvement in that process of arc welding in which a metallic electrode is continuously fed toward the work, which consists in causing the electric generator which supplies electric energy to the arc to accentuate the natural corrective tendencies of the arc by simultaneously and correctively varying both the current and the voltage at the arc.

17. In an arc welding apparatus, means for supplying electric energy to the arc, means actuated independently of both the welding circuit and the source of energy supply for continuously feeding the welding strip toward the work at a constant rate, and means for regulating the arc.

In testimony whereof I have hereunto signed my name in the presence of two subscribing witnesses.

HARRY D. MORTON.

Witnesses:
 THEODORA PUFFER,
 MARY E. COLTON.

DISCLAIMER.

1,392,436.—*Harry D. Morton*, Detroit, Mich. METHOD OF AND APPARATUS FOR ARC WELDING. Patent dated October 4, 1921. Disclaimer filed October 29, 1924, by the assignee, *Automatic Arc Welding Company.*

Hereby enters this disclaimer to claim 7 in said specification, which is in the following words, to wit:

"7. In a metallic electrode arc welding apparatus, means for continuously feeding a welding strip toward the work, and an over-compounded generator for controlling the relation between the rate of fusion and the rate of feed."

[*Official Gazette November 11, 1924.*]